US009067785B2

(12) United States Patent
Eng et al.

(10) Patent No.: US 9,067,785 B2
(45) Date of Patent: Jun. 30, 2015

(54) INTEGRATION OF A CLOSED LOOP SUPERCRITICAL CARBON DIOXIDE POWER CYCLE IN A STEAM METHANE REFORMER

(71) Applicant: L'AIR LIQUIDE, SOCIÉTÉ ANONYME POUR L'ÉTUDE ET L'ÉXPLOITATION DES PROCÉDÉS GEORGES CLAUDE, Paris (FR)

(72) Inventors: Bruce Eng, Houston, TX (US); Rahul Khandelwal, Houston, TX (US)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 3 days.

(21) Appl. No.: 14/043,290

(22) Filed: Oct. 1, 2013

(65) Prior Publication Data

US 2015/0093326 A1    Apr. 2, 2015

(51) Int. Cl.
*C01B 3/24* (2006.01)
*C01B 3/34* (2006.01)
*C01B 3/02* (2006.01)

(52) U.S. Cl.
CPC ........... *C01B 3/34* (2013.01); *C01B 2203/0805* (2013.01); *C01B 2203/0205* (2013.01); *C01B 3/02* (2013.01)

(58) Field of Classification Search
USPC ....................................................... 423/650
See application file for complete search history.

(56) References Cited

U.S. PATENT DOCUMENTS

| 2007/0264186 A1 | 11/2007 | Dybkjaer et al. |
| 2009/0229239 A1* | 9/2009 | Keller et al. ............... 60/39.182 |
| 2009/0232729 A1 | 9/2009 | Genkin et al. |
| 2012/0216536 A1 | 8/2012 | Ma et al. |

FOREIGN PATENT DOCUMENTS

| CA | 2 860 823 | 6/2013 |
| JP | 2012 145092 | 8/2012 |

OTHER PUBLICATIONS

International Search Report and Written Opinion for PCT/US2014/058178, mailed Jan. 5, 2015.
International Search Report and Written Opinion for PCT/US2014/058180, mailed Jan. 21, 2015.

* cited by examiner

*Primary Examiner* — Melvin C Mayes
*Assistant Examiner* — Kenneth Vaden
(74) *Attorney, Agent, or Firm* — Justin K. Murray; Elwood J. Haynes

(57) ABSTRACT

An integrated reforming and power generation process is provided. This process employs a steam methane reformer to provide a hot process gas stream and a flue gas stream, utilizes the hot process gas stream to provide heat to produce a total steam stream comprising a process steam stream and an excess steam stream, and utilizes the flue gas stream to provide heat to at least a pre-reformer mixture stream, a reformer feed stream, the process steam stream and a pre-reformer steam stream The flue gas stream also provides heat to an integrated power generation process, and the excess steam stream is less than 15% of the total steam stream.

12 Claims, 2 Drawing Sheets

US 9,067,785 B2

INTEGRATION OF A CLOSED LOOP SUPERCRITICAL CARBON DIOXIDE POWER CYCLE IN A STEAM METHANE REFORMER

BACKGROUND

In the interest of maximizing thermal efficiency in a standard Steam Methane Reformer (SMR) plant, steam is typically generated from two sources: flue gas waste heat and process heat. This inevitably leads to excess steam generation, more than required internally for the reforming process. In the absence of a steam customer, this results in the last resort measure of installing a steam turbine for realizing economic value.

The concept of supercritical carbon dioxide (S-CO2), as a promising heat extraction working fluid for cool down of nuclear reactors, has been in existence for more than a decade. Most of the technological developments in this area have occurred from a nuclear power perspective. The proof of concept has been well established experimentally. Under the DOE GEN-IV nuclear program, Sandia National lab has developed two small S-CO2 loops (~1 MW): Compression loop (at Sandia) and Brayton loop (at Barber Nichols). In the past few years, the idea of using S-CO2 cycle for non-nuclear applications has gained traction. Because of a lesser footprint, lower operating and capital costs, it has been proposed to be integrated in solar plants, molten carbonate fuel cells and as first bottoming cycle in combined cycle plants followed by steam as second bottoming cycle. Under the DOE Sunshot initiative (for solar applications), a 10 MWe scale up is currently under development along with industry partners. It is to be noted that for a standard SMR (120 MMSCFD), power generation is ~19 MW.

In SMR's, for good thermal efficiency purposes, the following ideas have been proposed/implemented. As discussed earlier, installation of a steam turbine to realize economic value out of excess steam. Multiple pre-reformers may be implemented to minimize excess steam. Helical Tube Reactor (HTR) technology has been developed to lower the temperature out of the reformer on the process side.

To date, no prior art exists which advocates the integration of S-CO2 in an SMR in the configuration as proposed herein for significant reduction or, possibly, an elimination of export steam.

SUMMARY

One embodiment of a closed loop supercritical carbon dioxide power generation process is disclosed. An integrated reforming and power generation process is provided. This process employs a steam methane reformer to provide a hot process gas stream and a flue gas stream, utilizes the hot process gas stream to provide heat to produce a total steam stream comprising a process steam stream and an excess steam stream, and utilizes the flue gas stream to provide heat to at least a pre-reformer mixture stream, a reformer feed stream, the process steam stream and a pre-reformer steam stream The flue gas stream also provides heat to an integrated power generation process, and the excess steam stream is less than 15% of the total steam stream.

DESCRIPTION OF PREFERRED EMBODIMENTS

Figure 1:
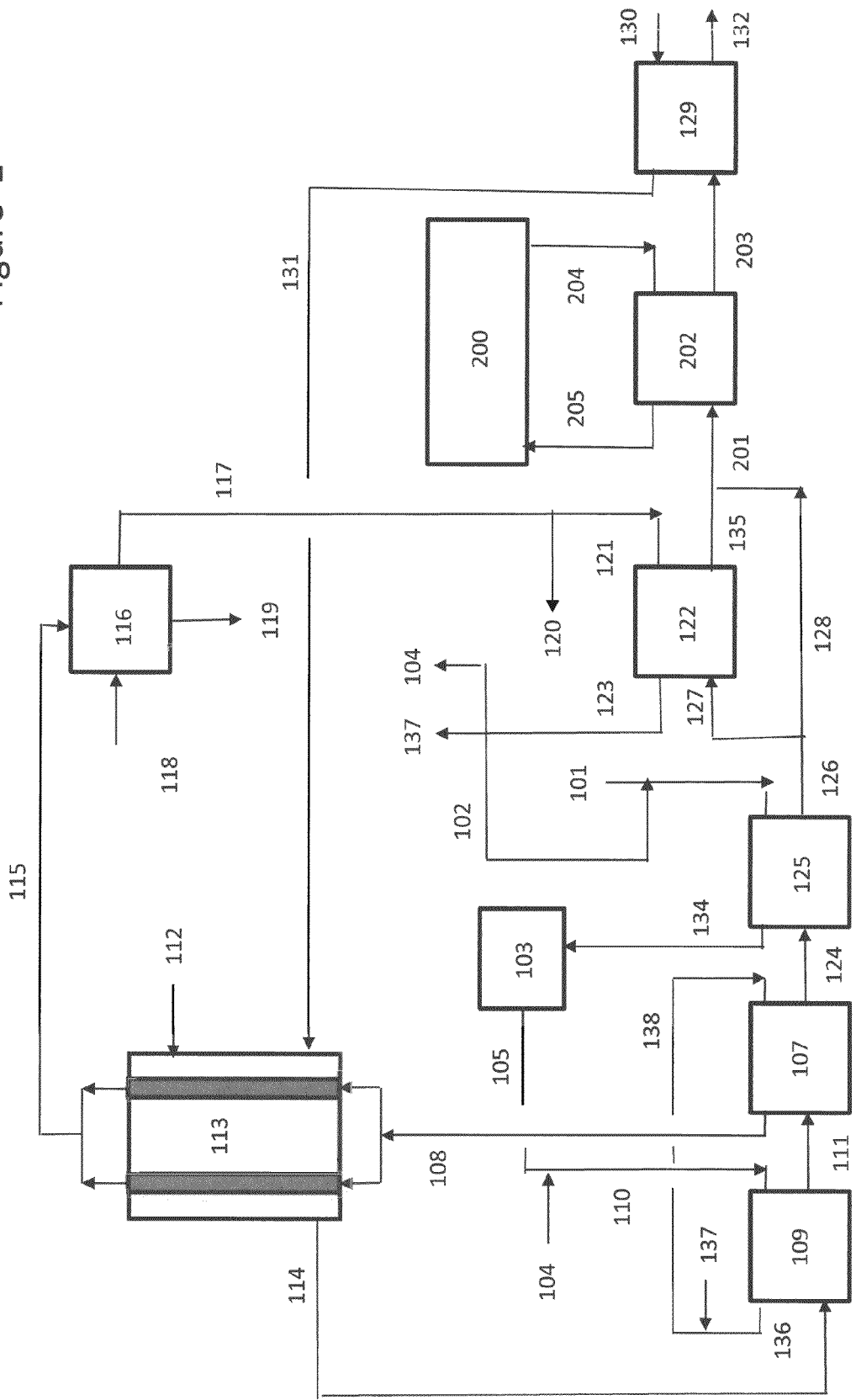
FIG. 1 is a schematic representation of one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In the present innovation, it is proposed to use the S-CO2 closed power loop for better exploiting the waste heat in the SMR flue gas section by splitting the flue gas outlet (T~750 deg C.) of the pre-reformer super-heater in the following fashion:

Since the integration is deliberately done in the 450-700° C. range, all the key SMR process parameters (i.e. pre-reformer S/C, pre-reformer inlet T, reformer S/C, reformer inlet T and WGS inlet T), input natural gas feed and hydrogen production have not been effected. It is anticipated that excess steam may still be generated, but this excess steam will be 12% of the original stream production, or less. The 12% excess steam can either be directly sold or used for electricity generation by installing a small steam turbine (which will be $\frac{1}{8}^{th}$ size of the steam turbine in a typical standard SMR).

In a supercritical cycle the working fluid is maintained above the critical point during the compression phase of the cycle.

Figure 2:
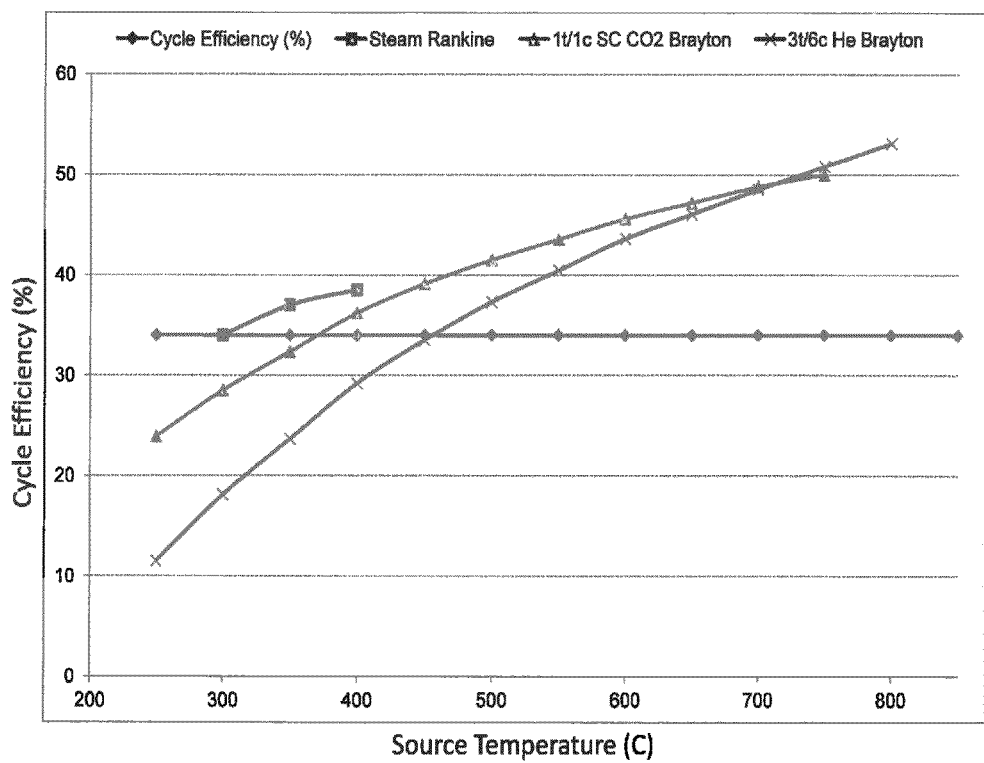
FIG. 2 is an illustration of the cycle efficiency of the various cycles as a function of source temperature.

As shown in FIG. 2, a simple SC CO2 Brayton cycle (comprising one turbine and one compressor) has higher thermodynamic efficiency than a steam (Rankine) cycle for temperatures greater than 450 deg C. The more complex 3t/6c (comprising three turbines and six compressors) He Brayton cycle has higher efficiencies than the simple SC CO2 Brayton cycle for temperatures greater than 700 deg C. Hence, in the temperature range 450-700 deg C., C CO2 is the optimum working fluid for heat extraction.

By adding an extra compressor and, the SC CO2 cycle achieves a thermodynamic efficiency of 50% in the same temperature range. The gain in efficiency, as compared to steam, is primarily because of a) a significant reduction in compression work due to the liquid like density near the critical point,
b) there are no pinch limitations as encountered in steam generation, since SC CO2 behaves like a single phase fluid in supercritical region, and
c) the critical point (31 deg C.) is near the desired heat rejection temperature of 20 deg C.

An added benefit, as compared to a steam cycle for same power output, is that the overall footprint is significantly reduced. The high pressure range (typically 70-200 bara)

helps in reducing the size of the compressors, turbines and heat exchangers by orders of magnitude. Further, CO2 is a non-toxic, inexpensive, stable, inert, relatively non-corrosive, inflammable and well characterized fluid.

Following are the key advantages realized from the proposed integration with an SMR:
a) the ability to minimize or, possibly, eliminate export steam generation
b) due to the higher efficiency of SC CO2 cycle, there is approximately a 12% gain in power generation when compared with a steam cycle. This is assuming a small steam turbine (~$\frac{1}{8}^{th}$ size of the steam turbine in a pure steam cycle, 80% efficiency and condensing) is installed.
c) the flue gas steam generator is eliminated and there is approximately a 35% reduction in boiler feed water requirement.
d) as previously mentioned, the overall footprint, as compared to steam cycle for the same power output, is significantly reduced.

Turning now to FIG. 1, one embodiment of the present invention is presented. Hydrocarbon fuel stream 101 and steam stream 102 are combined into pre-reformer mixture stream 133 and introduced into pre-reformer preheating module 125. Within module 125, pre-reformer mixture stream 133 is heated against flue gas stream 124, thereby producing heated pre-reformer stream 134 and flue gas stream 126.

Pre-reformer mixture stream 133 may have a temperature of between 275 and 350 C, preferably 310 C. Heated pre-reformer stream 134 may have a temperature of between 475 and 525 C, preferably 490 C. Flue gas stream 124 may have a temperature of between 825 and 875 C, preferably 850 F. Flue gas stream 126 thus exits module 125 with a reduced temperature of between 725 and 775 C, preferably 750 C.

Heated pre-reformer stream 134 is then introduced into pre-reformer 103, thereby producing reformer mixture 105. Reformer mixture 105 is then combined with steam stream 104 thereby forming reformer mixture 110. Reformer mixture 110 may have a temperature of between 575 and 625 C, preferably 600 C.

Reformer mixture 110 is then introduced into reformer preheating module 109. Within module 109 reformer mixture stream 110 is heated against flue gas stream 114, thereby producing heated reformer stream 136 and flue gas stream 111.

Heated reformer stream 136 is then combined with steam stream 137 thereby forming reformer mixture stream 138. Reformer mixture stream 138 is further heated in reformer pre-heating module 107. Within module 107, reformer mixture 138 is heated against flue gas stream 111, thereby producing heated reformer stream 108 and flue gas stream 124.

Flue gas stream 111 may have a temperature of between 875 and 925 C, preferably 900 C. Flue gas stream 114 may have a temperature of between 1025 and 1075 C, preferably 1057 C. Heated reformer stream 108 may have a temperature of between 625 and 675 C, preferably 652 F.

Heated reformer stream 108 then enters reformer 113, wherein it is heated and catalytically produces process gas stream 115. Fuel stream 112 and heated air stream 130 are introduced into reformer 113, where they combust, thereby providing heat for the above catalytic reaction, and producing flue gas stream 114. Process gas stream 115 enters heat recovery boiler 116, wherein condensate stream 118 is heated to produce process boiler steam stream 117, and syngas stream 119. Process boiler steam stream may have a temperature of between 250 and 300 C, preferably 270 C.

Flue gas stream 126 splits into flue gas stream 128 and flue gas stream 127. Flue gas stream 128 may comprise between 50 and 70%, preferably 60% of flue gas stream 126. At least a portion 121 of process boiler steam stream 117 enters superheater module 122, wherein it exchanges heat with flue gas stream 127, thereby producing flue gas stream 135 and super heated steam stream 123. Steam stream 123 is then split into at least stream 102, 104, and 137. Excess steam stream 120 may comprise less than 20% of the total process boil steam stream 117. Excess steam stream 120 may comprise between 10 and 15%, preferably 12% of the total process boil steam stream 117. Superheated steam stream 123 may have a temperature of between 300 and 350 C, preferably 335 C. Flue gas steam 135 may have a temperature of between 600 and 650 C, preferably 630 C.

Flue gas stream 135 is recombined with flue gas stream 128, thus producing flue gas stream 201. Flue gas stream 201 may have a temperature of between 675 and 725 C, preferably 700 C.

Flue gas stream 201 enters power cycle reheat module 202, wherein it indirectly exchanges heat with warm supercritical carbon dioxide stream 204, thereby producing heated supercritical carbon dioxide stream 205, and flue gas stream 203. Cooled combined flue gas stream 203 may further indirectly exchange heat with process streams, such as ambient air stream 114, thereby producing hot air stream 116 and exhaust gas stream 117. Cooled combined flue gas stream 203 may have a temperature of between 435 and 485 C, preferably 460 C. Exhaust gas stream 117 may have a temperature of between 100 and 200 C, preferably between 125 and 175 C, more preferably 150 C.

Flue gas stream 203 then enters air heater module 129, wherein it indirectly exchanges heat with inlet air stream 130, thereby producing heated air stream 131 and stack stream 132. Inlet air stream 130 may be ambient temperature. Inlet air stream 130 may have a temperature of between 0 and 40 C. preferably between 10 and 30, more preferably 20 C. Stack stream 132 may have a temperature of between 125 and 175 C, preferably 150 C.

Turning now to FIG. 2, one embodiment of the present invention is presented. Hot gas stream 201 indirectly exchanges heat with warm supercritical carbon dioxide stream 204, thereby producing heated supercritical carbon dioxide stream 205, and cooled combined flue gas stream 203.

Heated supercritical carbon dioxide stream 205 then enters turbine 206, wherein it is expanded, thus producing energy. The energy is mechanically introduced into shaft 223, wherein it powers main compressor 216 and re-compressor 218, with excess mechanical energy being converted to electricity in generator 222. As heated supercritical carbon dioxide stream 205 is expanded, it exits turbine 206 as expanded supercritical carbon dioxide stream 207. Expanded supercritical carbon dioxide stream 207 then enters high temperature recuperator 208, wherein it indirectly exchanges heat with combined stream 221 (described below).

This produces cooled expand supercritical carbon dioxide stream 109, and warm supercritical carbon dioxide stream 204. Cooled expand supercritical carbon dioxide stream 109 is then introduced into low temperature recuperator 210, wherein it indirectly exchanges heat with compressed first stream 217 (described below). This produces heated first stream 220 and cooled, expanded supercritical carbon dioxide stream 211. Cooled, expanded supercritical carbon dioxide stream 211 is then divided into first stream 212 and second stream 213. The first stream 212 may comprise between 50% and 70%, preferably between 55% and 65%, more preferably 60% of cooled, expanded supercritical carbon dioxide stream 211.

First stream 212 may enter reject heat exchanger 214, wherein it is cooled, thereby producing cooled first stream 215. Cooled first stream 215 then enters main compressor 216, wherein it is compressed into compressed first stream 217.

Second stream 213 enters re-compressor 218, wherein it is compressed into compressed second stream 219. Compressed second stream 219 is then combined with heated first stream, to produce combined stream 221.

What is claimed is:

1. An integrated reforming and power generation process comprising:
   employing a steam methane reformer to provide a hot process gas stream and a flue gas stream,
   utilizing the hot process gas stream to provide heat to produce a total steam stream comprising a process steam stream and an excess steam stream,
   utilizing the flue gas stream to provide heat to at least a pre-reformer mixture stream, a reformer feed stream, the process steam stream and a pre-reformer steam stream,
   wherein the flue gas stream also provides heat to an integrated power generation process, and
   wherein the excess steam stream is less than 15% of the total steam stream.

2. The integrated reforming and power generation process of claim 1, wherein the excess steam stream is 12% of the total steam stream.

3. The integrated reforming and power generation process of claim 1, wherein the integrated power generation process comprises a supercritical carbon dioxide cycle.

4. The integrated reforming and power generation process of claim 3, wherein the supercritical carbon dioxide cycle is a Brayton cycle.

5. The integrated reforming and power generation process of claim 3, further comprising a power cycle reheat module within the flue gas path.

6. The integrated reforming and power generation process of claim 5, wherein a flue gas stream entering the power cycle reheat module has a temperature of between 675 and 725 C.

7. The integrated reforming and power generation process of claim 6, wherein the flue gas stream entering the power cycle reheat module has a temperature of 700 C.

8. The integrated reforming and power generation process of claim 5, wherein a warm supercritical carbon dioxide stream enters and a heated supercritical carbon dioxide stream exits the power cycle reheat module.

9. The integrated reforming and power generation process of claim 8, wherein the warm supercritical carbon dioxide stream has a temperature of between 425 and 475 C.

10. The integrated reforming and power generation process of claim 9, wherein the warm supercritical carbon dioxide stream has a temperature of 450 C.

11. The integrated reforming and power generation process of claim 8, wherein the heated supercritical carbon dioxide stream has a temperature of between 650 and 700 C.

12. The integrated reforming and power generation process of claim 11, wherein the heated supercritical carbon dioxide stream has a temperature of 680 C.

* * * * *